Sept. 1, 1959 W. T. RENTSCHLER 2,901,953
PHOTOGRAPHIC INTRA-LENS SHUTTER WITH A DELAYED
ACTION DEVICE AND CONTACT ARRANGEMENT
FOR FLASH RELEASE
Filed Nov. 5, 1954 2 Sheets-Sheet 1
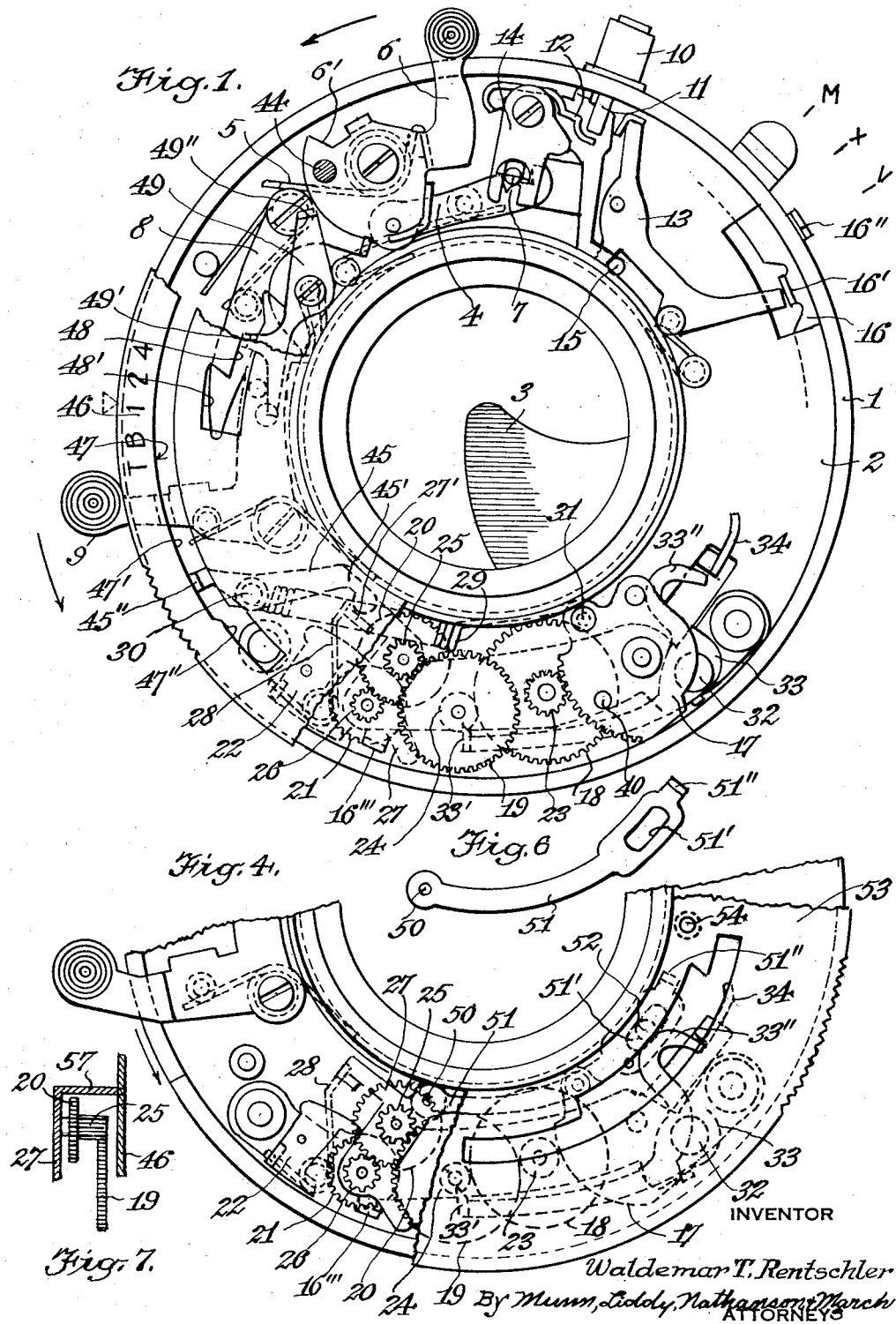
INVENTOR
Waldemar T. Rentschler
By Munn, Liddy, Nathanson+March
ATTORNEYS Sept. 1, 1959 W. T. RENTSCHLER 2,901,953
PHOTOGRAPHIC INTRA-LENS SHUTTER WITH A DELAYED
ACTION DEVICE AND CONTACT ARRANGEMENT
FOR FLASH RELEASE
Filed Nov. 5, 1954 2 Sheets-Sheet 2
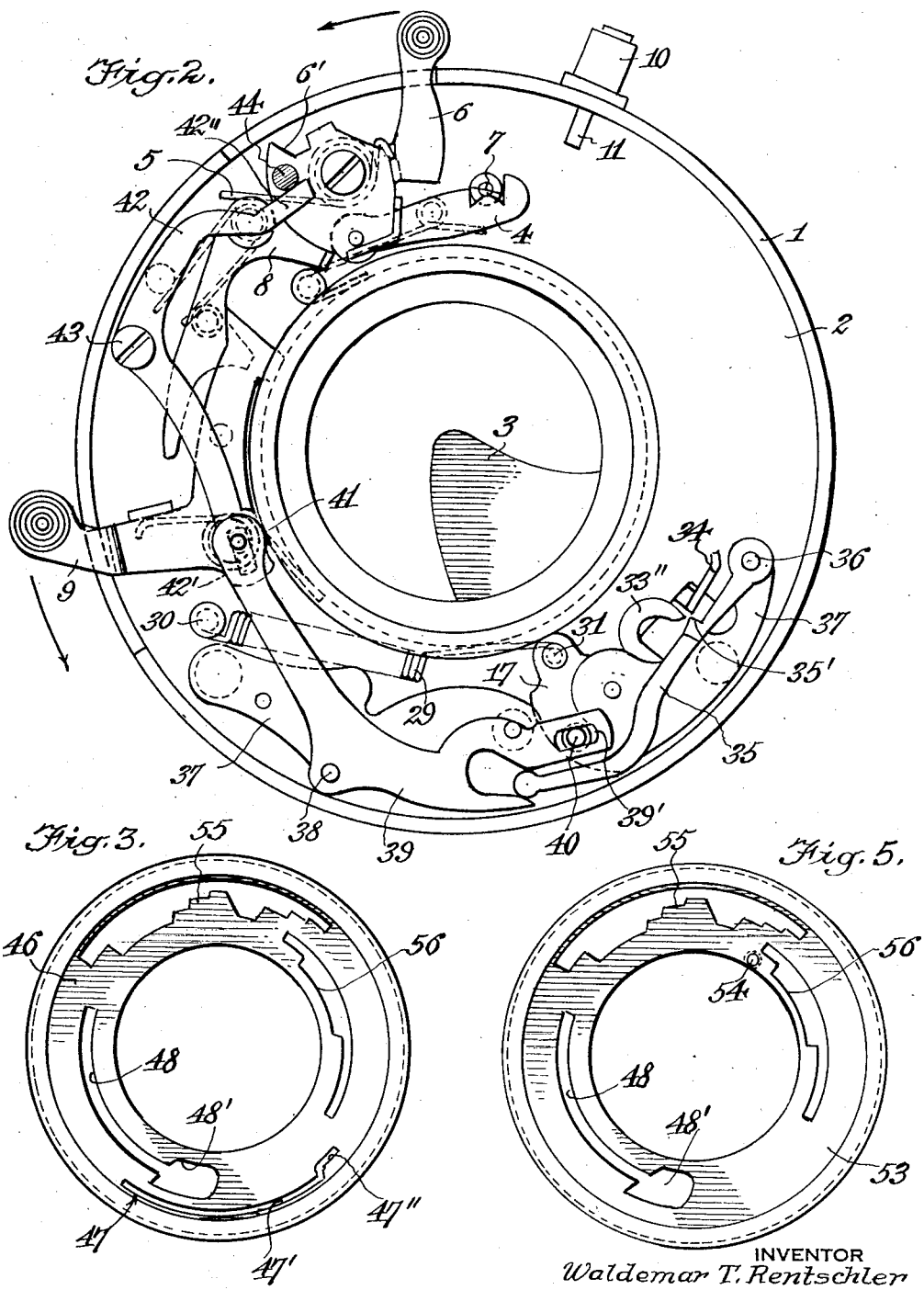
INVENTOR
Waldemar T. Rentschler
BY
Munn, Liddy, Nathanson & March
ATTORNEYS United States Patent Office 2,901,953
Patented Sept. 1, 1959

2,901,953

PHOTOGRAPHIC INTRA-LENS SHUTTER WITH A DELAYED ACTION DEVICE AND CONTACT ARRANGEMENT FOR FLASH RELEASE

Waldemar Traugott Rentschler, Calmbach (Enz), Germany, assignor to Alfred Gauthier G.m.b.H., Calmbach (Enz), Germany, a corporation of Germany Application November 5, 1954, Serial No. 467,096

Claims priority, application Germany November 18, 1953

6 Claims. (Cl. 95—11.5)

This invention relates to a photographic intra-lens shutter having a delayed action device for self-exposures, a contact arrangement for flash release and a flash synchronizer mechanism; and also having a mechanism for cocking said delayed action device and shutter operating means simultaneously, enabling a free setting for the exposures with or without the operation of the delayed action device, and also enabling setting for flash exposures by means of the synchronizer mechanism while the shutter is either cocked or uncocked.

For shutters having a delayed action device for self-exposures it is desirable to exclude the possibility of using the delayed action device when the speed setting member is set to "B" or "T." In a known manner this is effected by a locking device in such a way that the speed setting member cannot be set to "B" or "T" when the delayed action device is cocked, and that the delayed action device cannot be cocked when the setting member has been set to "B" or "T."

When the delayed action device of certain well known shutters has been cocked, the release of the shutters is possible only by the delayed action device.

The shutter of the present invention advantageously enables a free setting with regard to the adjusting and exposure possibilities whether the shutter is cocked or uncocked, and obviates the use of a locking device which would require a comparatively complicated shutter.

The principal object of the present invention is the provision of a shutter of the indicated character embodying improvements which do not require the use of the delayed action device when the shutter speed setting member is set to "B" or "T."

In accordance with the above mentioned object there is provided an actuating device which cooperates with disengageable means forming a part of the delayed action device, and a control device operatively connected with the speed setting member of the shutter, wherein said disengageable means and the flash synchronizer mechanism are uncoupled automatically when said speed setting member is set to "B" or "T."

The mentioned actuating and control devices may be diversely constructed, as by the use of a lever employed to cooperate with the disengageable means of the delayed action device, and control cam means embodied by the speed setting member which actuates said lever, or use may be made of a slidable member employed to cooperate with said disengageable means, and a pin on the speed setting member which actuates said slidable member in response to the adjustment of the speed setting member, for coupling as well as uncoupling the flash synchronizer mechanism.

The accompanying drawings illustrate some embodiments of the present invention, in which—

Fig. 1 is a front view of a shutter embodying certain features of the invention, the shutter being uncocked and adjusted for the use of the delayed action device, certain parts being omitted and other parts being broken away.

Fig. 2 is a view similar to Fig. 1 but omitting certain of the parts shown in Fig. 1.

Fig. 3 is a front view of the speed setting ring shown in Fig. 1.

Fig. 4 is a fragmentary front view of the shutter showing a modification of the actuating and control devices in accordance with the present invention.

Fig. 5 is a front view of the modified speed setting ring shown in Fig. 4.

Fig. 6 is a front view of the control slide shown in Fig. 4.

Fig. 7 is a detail sectional view of a further modification.

On reference to Fig. 1 of the drawings, it will be apparent that the shutter of the present invention includes a circular shutter housing 1 having within the same a base plate 2. The shutter blades, only one of which is shown and is designated 3, are operated by a blade ring having reciprocatory rotational movement, said ring not being visible in its entirety. The blade ring is driven by means of a link 4 having one end pivotally connected with a cocking lever 6 biased clockwise by a spring 5, said lever being fulcrumed on the plate 2. The other end of the link 4 has a notch into which projects a pin 7 fixed on the blade ring. The lever 6 is held in its cocked position by a lever 8 fulcrumed on the plate 2. A spring biased release lever 9 fulcrumed on the plate 2 is manually operable to actuate the lever 8 to cause the operation of the shutter.

In order to actuate a flash gun the shutter is equipped with an electrical plug device 10 whose insulated pin 11 is engageable in a well known manner with a contact spring 12 and a lever 13 mounted on the plate 2. For actuating the contact spring 12 there is provided a lever 14 fulcrumed on the plate 2, said lever 14 being engageable with the spring 12 for closing an electric circuit through the pin 10 at the moment when the shutter aperture is fully open, whereby the pin 7 engages the lever 14, while the lever 13 engages the pin 10 after a small angular movement of the blade ring in which the pin 15 on said ring acting on the lever 13 frees the latter. It is to be understood that the circuit closing operation occurs only when the lever 13 is not held inactive by the arm 16' of a ring 16 supported for rotational movement on the housing 1. The lever 13 is in an active position when the index 16" of the ring 16 points to the mark M. When the index 16" is adjusted to the mark X or V the lever 13 is held inactive. Pin 15 serves to synchronize the shutter and flash when the lever 13 is not held inactive by the arm 16' of the ring 16.

In Fig. 1 there is illustrated a mechanism comprising a toothed segment 17, gear wheels 18, 19 and 20, balance wheel 21, balance 22, and pinions 23, 24, 25, and 26. The gear 20, pinions 25 and 26, balance wheel 21, and the balance 22 are mounted on a bridge 27 swingable around on the arbor of the balance wheel 21. A spring 28 biases the bridge 27 in a clockwise direction. The parts 17, 23, 18, 24 and 19 constitute a flash synchronizer mechanism, while these parts and the parts 27, 25, 20, 26, 21 and 22 together constitute the delayed action device for self-exposures. The delayed action device is driven by means of a spring 29 having one end connected with a pin 30 on the plate 2 and its other end is connected with a pin 31 on the toothed segment 17. For arresting the delayed action device cocked, use is made of a spring pressed two-armed lever 33 fulcrumed at 32, said lever 33 having a projection 33' on one of its arms, and the projection being engageable with the pinion 24.

As shown in Fig. 2, the release of the delayed action device is accomplished by an arm 34 on the blade ring, said arm 34 encountering the end 33" of the second arm of the lever 33 thereby turning the latter anticlockwise and so causing the projection 33' to become disengaged from the pinion 24 enabling the delayed action device to run down. Its release occurs after a slight angular movement of the shutter blade ring, while the shutter blades remain closed owing to the overlap of the blades when closed. In the interval between the start of the movement of the blade ring and the release of the delayed action device by means of the arm 34, a flash circuit closing operation is effected by means of the lever 13, assuming release index 16" has been set on M.

For arresting the shutter blade ring and its arm 34, there is provided a lever 35 fulcrumed at 36 on a bearing plate 37 of the delayed action device. The lever 35 has a nose 35' which confronts the arm 34 and prevents the latter and the blade ring on which it is fixed from having clockwise movement beyond a predetermined distance. See Fig. 2.

In order to release the blade ring the lever 35 is actuated by a two-armed lever 39 fulcrumed at 38 on the plate 37. A pin 40 fixed on the segment 17 engages in a slot 39' in said lever 39. Therefore when the lever 39 is moved clockwise the lever 35 is actuated thereby disengaging the nose 35' from the arm 34. By this the blade ring released to effect the shutter blade operation.

Cooperating with the cocking lever 6 and the lever 39 is a lever 42 fulcrumed at 43 on the plate 2. A pin 41 on the end of the second arm of the lever 39 engages in a slot 42' in the lever 42. A beveled pin 44 on the lever 6 acts on the arm 42" of the lever 42 as the lever 6 is manipulated anticlockwise thereby causing the lever 42 to move clockwise, and through the intervention of the pin 41 the lever 42 causes the lever 39 to move anticlockwise. Thus the parts 40, 39, 41, 42, 44 and 6 function to cock the shutter and the delayed action device simultaneously.

According to this invention the parts 21, 22, 25, 26, 27 and 20 may be coupled with and may be uncoupled from the parts 17, 18, 19, 23 and 24 of the delayed action device by the operation of the bridge 27. For this purpose an actuating device in the form of a two-armed lever 45 is used. This lever 45 is fulcrumed on the pin 30. One arm 45' of the lever 45 is cooperatively disposed with respect to the arm 27' of the bridge 27. The second arm of the lever 45 has a laterally projecting lug 45". A speed setting ring 46 has rotational movement on the housing 1. The ring 46 has an arcuate cam slot 47 consisting of a portion 47' and an offset portion 47" in continuation of the portion 47' at one end of the latter portion. The slot 47 is concentric to the center of the ring 46. The lug 45" projects into the slot 47. When the lug 45" is in the portion 47' the lever 45 remains dormant. When the speed setting ring 46 is turned clockwise the lug 45" is cammed by the slot portion 47" causing the lever 45 to move clockwise and the bridge 27 to move anticlockwise in response to said clockwise movement of the lever 45. The anticlockwise movement of the bridge 27 takes the pinion 25 out of meshing engagement with the gear wheel 19 and therefore the parts 27, 25, 20, 26, 21 and 22 of the delayed action device are uncoupled from the parts 17, 23, 18, 24 and 19 constituting the flash synchronizer mechanism. Thus the delayed action device may be rendered useful independently but idle while the synchronizer mechanism is in operation upon the speed setting ring 46 being set at "B" or "T." This is accomplished in a very simple manner economically due to low cost of manufacture and assemblage of the parts of the shutter. Also, the free setting possibilities are maintained to the fullest extent even when the shutter is cocked.

For a bulb exposure operation, the speed setting ring 46 is set to "B" or "T" with respect to a lever 49 fulcrumed on the plate 2. The lever 49 is spring biased to move in a clockwise direction. The lever 49 has a lateral projection 49' on its lower arm and a lateral lug 49" on its upper arm. The ring 46 has an arcuate control slot 48 which at one end is enlarged as at 48'. The slot 48 is concentric to the center of the ring 46. When the ring 46 is set to "B" so that the lever 49 moves clockwise into a position in which the lug 49" is in the path of the nose 6' on the cocking lever 6, the projection 49' occupies the slot portion 48'. Therefore, after the shutter has been released by moving the lever 9 anticlockwise as indicated by the arrow, the shutter will be held open by reason of the engagement of the nose 6' with the lug 49", until the pressure on the lever 9 is withdrawn and thereby enabling the shutter to close. As stated above, the lever 49 as viewed in Fig. 1 has a depending arm extending below the projection 49'. The release lever 9 has a pin shown in dotted lines adjacent the latter arm. The spring which biases the arm 49 to move clockwise forces this depending arm against the pin. Thus the release lever 9 maintains lug 49" out of the path of the nose 6' even when the enlarged portion 48' of the slot 48 is presented to the lug 49' until the release lever 9 is operated. When release lever 9 is operated to release the shutter the lug 49", as stated, will engage the nose 6' if the ring 46 is in the position in which the enlarged portion 48' is opposite the projection 49'. When the release lever is released after the shutter is stopped in open position the unnumbered pin on the release lever will force the lever 49 to rotate counterclockwise as viewed in Fig. 1 and this will move the lug 49" off of the nose 6'.

In Fig. 4 there is shown another embodiment of the mechanism which uncouples the synchronizer from the rest of the parts of the delayed action device, and also shows the control means of the delayed action device. In Fig. 4 there is shown an arcuate slide 51 having a lateral pin 50 on one end, a slot 51' therein near its other end, and a lateral lug 51" on the latter end. A speed setting ring 53, similar to the ring 46 except that the slot 47 is omitted, and a pin 54 are provided. The pin 50 of the slide 51 is engaged in a hole in the bridge 27. A pin 52 on the plate 2 projects into the slot 51' to guide the slide 51 in an arcuate path when the slide is actuated clockwise by a pin 54 on the ring 53, said pin 54 bearing on the lug 51" when the ring 53 is given clockwise setting movement. This causes the bridge 27 to move anticlockwise with the result that the pinion 25 is moved out of meshing engagement with the gear wheel 19. This second embodiment has all of the advantages and benefits of the embodiment of Fig. 1, and has the additional advantage that a special notched device for the bridge 27 in the uncoupling position is not necessary, because the spring 28 does not have to overcome the friction between the ring 53 and its guide faces.

Cam means for regulating the shutter speeds of well known escapement mechanism (not shown) is formed on both rings 46 and 53 and is designated 55. The cam 56 controls the engagement of the pallet of said escapement mechanism.

Also as shown in Fig. 7, a control device such as pin or arm 57 on the bridge 27 and adapted to operate the same may be actuated directly by means on the speed setting ring 46 or ring 53 within the scope of the present invention.

The operation of the shutter of the above described embodiments of the invention, simply stated, is as follows.

The cocking is done by manipulating the lever 6 in the direction indicated by the arrow, and through the intervention of the levers 42 and 39 the delayed action device and the shutter are cocked simultaneously.

Release is accomplished by manipulating the lever 9 in the direction indicated by the arrow. This causes the release of the cocking lever 6 and the shutter blade ring. Then after a slight angular movement of the ring it releases the delayed action device and synchronizer mechanism by striking the end portion 33" of the lever 33. Then the shutter blade ring is stopped by the engagement of the arm 34 with the nose 35' of the lever 35 which frees the shutter blade ring after the running down of the delayed action device and the flash synchronizer mechanism.

The setting possibilities are as follows.

The ring 16 may be set to the markings M, X and V by means of the pointer 16".

(1) When set to the marking M, the bridge 27 is moved in an anticlockwise direction by the arm 16''' of the ring 16, and by this only the flash synchronizer becomes effective when the shutter runs down. Furthermore, in this setting position the arm 16' frees the contact lever 13 so that a contact closure may be established by the pin 11 and the lever 13. Therefore, in the M position of the shutter, flash exposures may be made by using flash bulbs (M-bulbs) with high and highest shutter speeds.

(2) When set to X, the disengageable part 25 of the delayed action device is also uncoupled from the synchronizer mechanism as it is in the M setting position, but in the X setting position the lever 13 is arrested by the arm 16'. Therefore, the contact closure is only possible by means of the pin 11 and contact spring 12. This contact closure occurs at the moment when the shutter aperture is fully open. In the X position the shutter may be used for normal exposures without flash lamps or guns, and for exposures with electronic flash and with flash lamps that are used only for slower shutter speeds.

(3) When set to the marking V, the ring 16 is in such position that its arm 16''' does not influence the bridge 27. Therefore, the pinion 25 remains in engagement with the gear wheel 19 and the delayed action device becomes active when the shutter runs down. The contact closure for eventually connected flash guns occurs by the cooperation of the pin 11 and the contact spring 12.

When the shutter is set to "B" or "T" by adjusting the speed setting ring, the above described control and actuating devices effect an automatic uncoupling of the delayed action device from the flash synchronizer by reason of the disengagement of the pinion 25 from the gear wheel 19. Therefore, the delayed action device is disengaged during the release by manipulation of the lever 9 in spite of the setting of the ring 16 to the marking V. After pressing down the release lever 9 only the synchronizer mechanism runs down with an utmost short delay time of about 15 m. sec. before the shutter is opened. Therefore, the operator of the shutter has the full assurance that exposure failures are avoided in every case without controlling the setting ring 16 for "B" or "T" exposures. These failures may occur in prior shutter structures when the operator allows return of the release lever 9 during the running down of the delayed action device as long as the latter is switched in and the shutter is set to "B" or "T."

It will therefore be appreciated that regardless of the preselected M, X and V settings when the shutter is set to "B" or "T" there results a special advantage in that exposure failures are always avoided by the provision of the above described simple additional devices.

I claim:

1. In a photographic lens shutter, a shutter actuating means, said shutter having a delayed action device comprising two groups one of which is shiftably mounted and engageable with and disengageable from the other, cocking means for the said other group of the delayed action device and for the shutter, said delayed action device when the groups thereof are engaged having a running down time measured in seconds for enabling self exposures and when the groups thereof are disengaged having a running down time measured in milli-seconds, a movable actuating device operably connected with the said one group of the delayed action device and operable to shift the same, a control device adapted to operate said actuating device, a speed setting member operably connected to the shutter actuating means and operable to adjust the speed of the shutter, said speed setting member being cooperative with said control device and having "B," "T" settings, means providing a delayed action of the shutter when the said setting member is adjusted to "B" or "T" setting, means connected to said member movable into operative connection with said control device so as to operate the control device and to cause said actuating device to automatically disengage the said one group of the delayed action device when the member is adjusted to "B" or "T" setting.

2. The invention as defined in claim 1, in which there is a second settable member having M, X and V setting positions, a flash-contact control means adapted to be actuated by the second setting member, and in which there is means for shifting said one group of the delayed action device to engage the same with the other group thereof when the second settable member is moved to V exposure setting.

3. The invention as defined in claim 1, including means connected to the said cocking means, said shutter and said delayed action device to effect a simultaneous cocking of the delayed action device and the shutter.

4. The invention as defined in claim 1, in which there is a lever carrying said one group of the delayed action device, and in which said speed setting member comprises a cam means and said control device comprises a cam follower engaged with said cam means.

5. The invention as defined in claim 1, in which the groups of the delayed action device include a gear and pinion respectively, engagement of said groups being characterized by meshing of said gear and pinion and disengagement of the groups being characterized by separation of the gear and pinion.

6. The invention as set forth in claim 1 wherein said control device includes a slidable member engaging said actuating device and in which the means connected to said speed setting member includes a pin on said speed setting member, which cooperates with said slidable member.

References Cited in the file of this patent

UNITED STATES PATENTS

| 2,435,161 | Schwarz | Jan. 27, 1948 |
| 2,480,604 | Pirwitz | Aug. 30, 1949 |
| 2,490,163 | Schwarz | Dec. 6, 1949 |
| 2,650,526 | Gebele | Sept. 1, 1953 |
| 2,663,233 | Rentschler | Dec. 22, 1953 |